Aug. 31, 1948.　　　G. J. RECKER　　　2,448,122
FARM WAGON UNLOADING DEVICE
Filed Nov. 15, 1946　　　　　　　　　　2 Sheets-Sheet 1
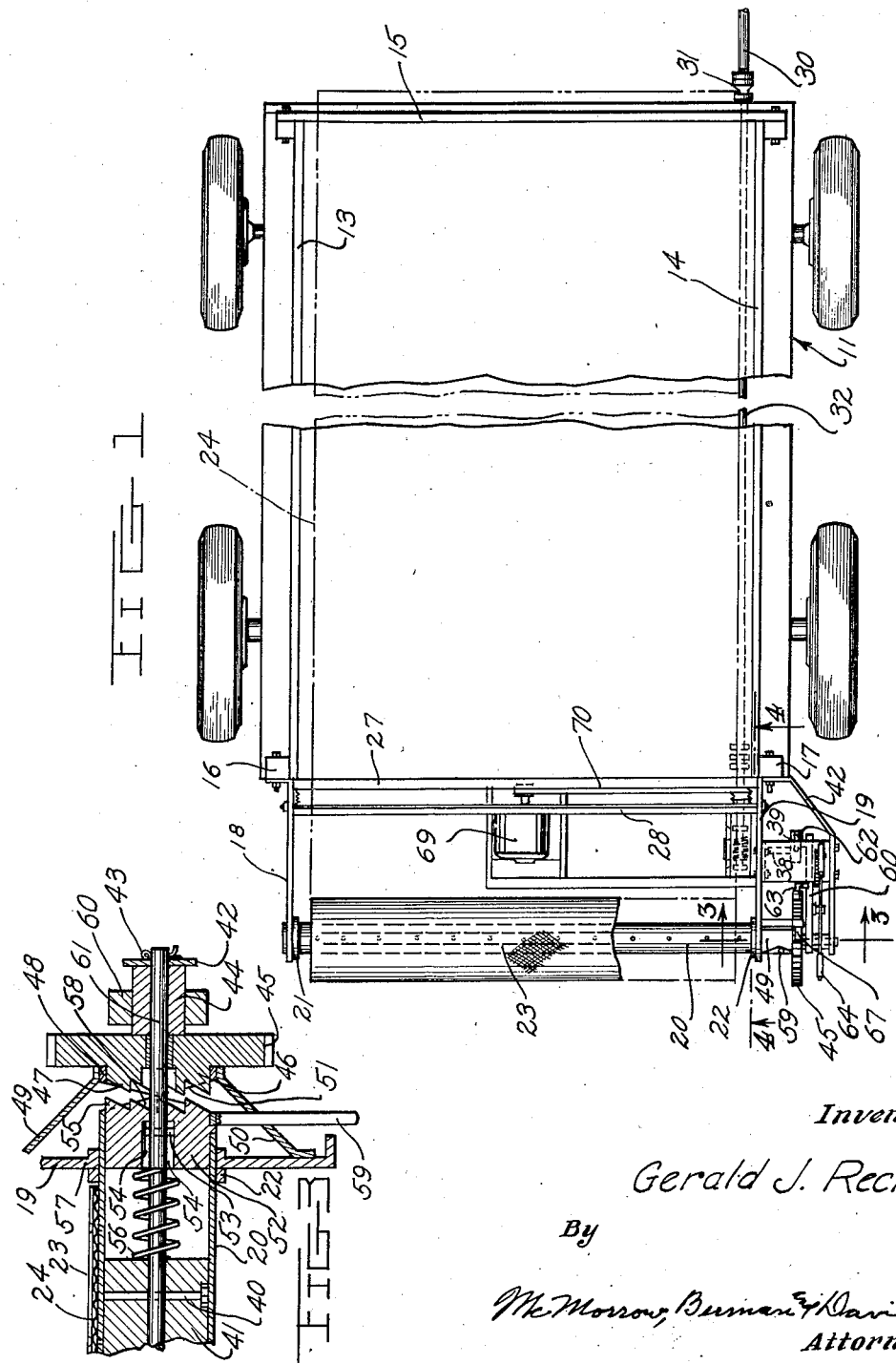
Inventor
Gerald J. Recker
By
McMorrow, Berman & Davidson
Attorneys

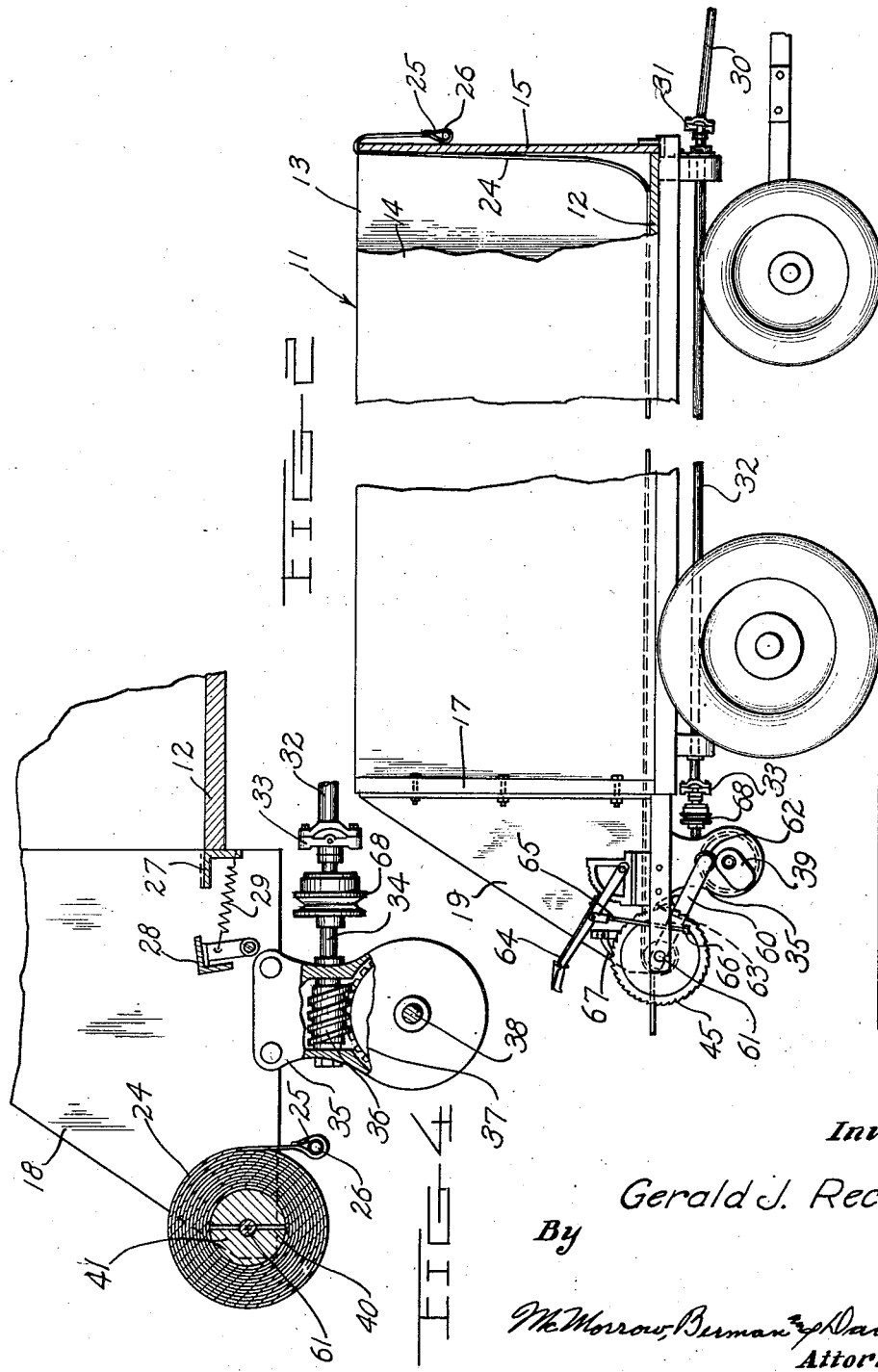

Patented Aug. 31, 1948

2,448,122

UNITED STATES PATENT OFFICE 2,448,122

FARM WAGON UNLOADING DEVICE

Gerald J. Recker, Hopkinton, Iowa

Application November 15, 1946, Serial No. 710,212

1 Claim. (Cl. 214—83.34)

This invention relates to farm wagon unloading devices, and more particularly to wagon unloading devices of the conveyor type.

A main object of the invention is to provide a novel and improved farm wagon unloading device which is very simple in construction, efficient in operation and reliable in performance.

A further object of the invention is to provide an improved farm wagon unloading device which is inexpensive to construct, easy to install and which is readily adjustable to provide a desired rate of unloading of material from a farm wagon.

Further objects and advantages of the invention will become apparent from the following description and claim, and from the accompanying drawings, wherein:

Figure 1 is a top plan view, with parts broken away, of a farm wagon equipped with an unloading device according to the present invention.

Figure 2 is a side elevational view, partly in cross-section, of the wagon shown in Figure 1.

Figure 3 is an enlarged cross-sectional detail view taken on line 3—3 of Figure 1.

Figure 4 is an enlarged cross-sectional detail view taken on line 4—4 of Figure 1.

Referring to the drawings, 11 designates a farm wagon having a floor 12, side walls 13 and 14 and a front end wall 15. The rear end of side wall 13 is provided with a vertical post 16 and the rear end of side wall 14 is provided with a similar vertical post 17. Secured to post 16 is a triangular rearwardly extending plate member 18. Secured to post 17 is a similar triangular rearwardly extending plate member 19.

Journalled in the rear end portions of plate members 18 and 19 on an axis slightly below the plane of floor 12 is a transverse tubular shaft 20, one end portion of said shaft carrying a bearing collar 21 which rotatively engages the inside surface of plate member 18 and the other end portion of said shaft carrying a bearing collar 22 which rotatively engages the inside surface of plate member 19. Clamped to tubular shaft 20 by an elongated metal strip 23 is a sheet 24 of heavy flexible material such as canvas which is slightly smaller in width than the inside width between walls 13 and 14 and is of sufficient length to extend forwardly over the full length of floor 12 and to be looped over the forward vertical wall 15 thereof, as shown in Figure 2. The forward edge of sheet 24 is formed with a loop 25 and a rigid metal tube 26 is positioned in the loop to stiffen and weight said forward edge. When tubular shaft 20 is rotated counter-clockwise, as viewed in Figure 2, sheet 24 is rolled up on said shaft, and any material which is positioned on said sheet is carried rearwardly thereby and is deposited rearwardly of the wagon.

Secured to the rear edge of floor 12 is transverse marginal angle bar 27. Pivotally mounted between plate members 18 and 19 adjacent bar 27 is a transverse angle bar 28 biased to a forward position by a spring 29. As sheet 24 is pulled rearwardly by shaft 20 with its load of material, such as forage or grain, or the like, pivoted angle bar 28 provides a scraping action on the bottom surface of the sheet to aid in loosening the material therefrom.

The driving means for shaft 20 comprises a drive shaft 30 which is adapted to be coupled to a suitable prime mover means, such as the power take-off shaft of a tractor. Shaft 30 is coupled by a universal joint 31 to an intermediate shaft 32 journalled longitudinally to the wagon frame. Shaft 32 is coupled by a universal joint 33 to a shaft 34 journalled in a housing 35 depending from plate member 19. Shaft 34 carries a worm 36 which meshes with a worm gear 37 carried on a shaft 38 journalled in housing 35. External to housing 35 shaft 38 carries an eccentric cam 39. Secured in tubular shaft 20 by a transverse bolt 40 is a plug member 41 and secured axially in said plug member by bolt 40 is a rod 61. Secured to post 17 is a rearwardly extending laterally off set bracket member 42. The end portion of rod 61 is rotatively secured in the rear end portion of bracket member 42 by a cotter pin 43. Mounted on rod 61 adjacent bracket 42 is a spacer sleeve 44. Rotatively mounted on rod 61 adjacent spacer sleeve 44 is a ratchet wheel 45. Ratchet wheel 45 is formed with an inwardly facing collar 46 formed with radial clutch teeth 47. Encircling collar 46 is a stationary bearing collar 48 carried by a pair of bracket members 49 and 50 secured to plate member 19. Collar 48 is formed with diametrically located inwardly facing tapered cam portions 51. Slidably mounted in the end of tubular shaft 20 is a plug member 52. Plug member 52 is keyed to rod 61 by a transverse pin 53 carried by the rod and slidably received in longitudinal keyways 54, 54 formed internally of the plug member. Plug member 52 is formed with outwardly facing clutch teeth 55 adapted to interlock with clutch teeth 47 of collar 46. A coiled spring 56 encircling rod 61 and bearing between plug 41 and plug member 52 biases said plug member 52 outwardly toward the inter-locking position of the clutch teeth. Journalled in an annular recess formed on plug member 52 adjacent the teeth 55 is a collar member 57 having outwardly, facing diametrically opposed tapered cam portions 58. Collar member 57 also carries a handle 59. In the position of handle 59 shown in Figure 3, the crest elements of cam portions 51 and 58 are in mutual abutment, whereby the plug member 52 is moved inwardly to disengage the clutch teeth 47 and 55. By rotating handle 59 90 degrees the cam portions are permitted to nest together by the expansion of spring 56 as it moves plug member 52 outwardly and teeth 47 and 55 interlock, coupling ratchet wheel 45 to rod 61.

Pivoted on spacer sleeve 44 is an arm 60 which extends forwardly and carries at its forward end a roller 62 which engages the top edge surface of eccentric cam 39. Arm 60 also pivotally carries a gravity biased pawl member 63 which engages the ratchet teeth of ratchet wheel responsive to upward movement of arm 60 to rotate said ratchet wheel through an arc of travel. This occurs each time eccentric cam 39 rotates. The magnitude of this arc of travel is controlled by a lever 64 to which is pivoted a depending rod 65 passing through a lug carried by arm 60. At the end of rod 65 is a head 66 which cooperates with the aforementioned lug to limit downward movement of arm 60 in accordance with the position of adjustment of lever 64.

During actuation of shaft 20 by ratchet wheel 45 reverse movement of said ratchet wheel is prevented by a gravity-biased pivoted pawl member 67 engaging the teeth of the ratchet wheel at its top portion, said pawl member being carried by plate member 19.

Shaft 34 is provided with a pulley 68 so that the mechanism may be driven if desired by an electric motor 69 mounted below the rear portion of the wagon and coupled by a belt 70 to pulley 68. Motor 69 is employed where electric power is available and is otherwise uncoupled from pulley 68 when the mechanism is driven by an external prime mover.

In operation, lever 59 is first positioned as shown in Figure 3, whereby shaft 20 is free, and the sheet 24 is positioned as shown in Figure 2. The wagon is then loaded. To unload the wagon, lever 59 is rotated 90 degrees from its initial position, causing the clutch teeth 47 and 55 to interlock. The shaft 34 is then rotated, either by an external prime mover or by the electric motor 69, causing cam 39 to rotate. This oscillates arm 60 and causes stepwise rotation of ratchet wheel 45. Sheet 24 is thus rolled up on shaft 20, moving the loaded material rearwardly of the wagon and depositing it to the rear of the roll. The rate of unloading may be regulated by the adjustment of hand lever 64.

While shaft 20 has been specifically described herein as operating a canvas sheet wound thereon as the discharge conveyor, it is also contemplated as within the spirit of the invention that shaft 20 may be employed to operate a movable end gate instead of a sheet conveyor, in which case the actuating cables for the end gate would be wound on shaft 20 by the above described driving mechanism. The rearward movement of the end gate would discharge the load by pushing it rearwardly off the end of the wagon.

While a specific embodiment of a farm wagon unloading device has been disclosed in the foregoing description, it will be understood that various modifications within the spirit of the invention may occur to those skilled in the art. Therefore it is intended that no limitations be placed on the invention other than as defined by the scope of the appended claim.

What is claimed is:

An unloading apparatus for wagons having substantially vertical sides and a flat bottom forming an open end, said apparatus comprising support members secured to the vertical sides and extending rearwardly beyond the same, a substantially horizontal rotary tubular shaft mounted upon said support members and arranged in substantial alignment with said bottom, an elongated sheet of flexible material, means securing one end of said sheet to the tubular shaft, the opposite end of said sheet being free, the body portion of the sheet being receivable upon the bottom of the wagon and beneath the load, a gear housing mounted upon one of said support members, driving and driven gears arranged within the gear housing, an eccentric arranged exteriorly of the gear housing and driven by said driven gear, a relatively stationary plug mounted in said tubular shaft near its end adjacent to said gear housing, an axial rod secured to the relatively stationary plug and extending axially outwardly beyond the end of the tubular shaft, an axially slidable plug mounted upon the rod and having clutch teeth at its outer end, a spring to bias the axially slidable plug outwardly, a rotatable collar including a handle slidably mounted upon the axially slidable plug and including outer tapered cam portions, a ratchet wheel rotatably mounted upon the rod outwardly of the axially slidable plug and including inwardly facing clutch teeth, a stationary collar rotatably receiving the ratchet wheel and provided with inner tapered cam portions to coact with the outer tapered cam portions when said handle is turned, an arm pivotally connected to the rod outwardly of the ratchet wheel and having a part to engage the teeth of the ratchet wheel to turn the same, the free end of the arm contacting the eccentric to be oscillated by the same, means to adjust the extent of oscillation of the arm, and means to drive the driving gear.

GERALD J. RECKER.

REFERENCES CITED

The following references are of record in the file of this patent:

UNITED STATES PATENTS

| Number | Name | Date |
|---|---|---|
| 1,141,861 | Bausman | June 1, 1915 |
| 2,054,247 | Dilger et al. | Sept. 15, 1936 |
| 2,407,430 | MacRae | Sept. 10, 1946 |
| 2,340,983 | Pfeiffer et al. | Feb. 8, 1944 |
| 2,355,226 | Mallory | Aug. 8, 1944 |